J. W. AYLSWORTH.
COMPOSITION AND PROCESS OF MANUFACTURING THE SAME.
APPLICATION FILED MAY 14, 1909.
1,102,630.
Patented July 7, 1914.
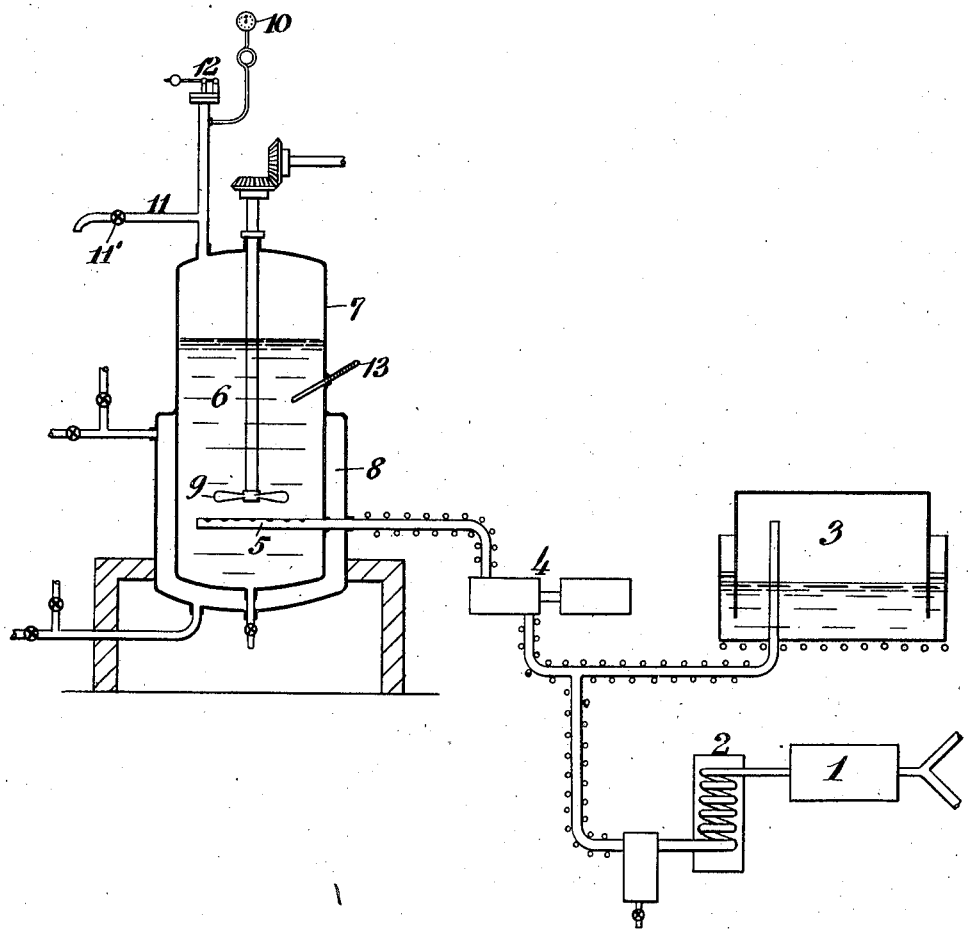

UNITED STATES PATENT OFFICE.

JONAS W. AYLSWORTH, OF EAST ORANGE, NEW JERSEY, ASSIGNOR, BY DIRECT AND MESNE ASSIGNMENTS, TO CONDENSITE COMPANY OF AMERICA, OF EAST ORANGE, NEW JERSEY, A CORPORATION OF NEW JERSEY.

COMPOSITION AND PROCESS OF MANUFACTURING THE SAME.

1,102,630.  Specification of Letters Patent.  Patented July 7, 1914.

Application filed May 14, 1909. Serial No. 496,060.

*To all whom it may concern:*

Be it known that I, JONAS W. AYLSWORTH, a citizen of the United States, and a resident of East Orange, in the county of Essex and State of New Jersey, have invented a certain new and useful Composition and Process for Manufacturing the Same, of which the following is a description.

My invention relates to compositions for molding various articles, such as may be made from celluloid, hard rubber and kindred substances, and also, to the production of synthetic resins, which may be used for varnish gums, for baking enamels and japans, and as solid solvents for pyroxylin and cellulose acetate and the like. The composition first mentioned may likewise be used for the formation of insulators, phonograph records, and in many other connections.

My invention comprises more specifically, first, the formation of a hard fusible phenol resin from phenol or cresol by condensation with formaldehyde, the same being claimed as a new product and a process for manufacturing the same being also claimed. This is the synthetic resin above referred to. Secondly, my invention comprises the formation of an ultimate infusible condensation product of a phenol and formaldehyde, or equivalents of these substances, this infusible product being very hard and chemically inert, but, when made in the preferred manner sufficiently plastic on application of heat, as hereinafter described, to be shaped or pressed into form at suitable temperatures. This ultimate condensation product is preferably formed from the phenol resin, referred to above, but an infusible condensation product having many of the advantages of this preferred product may be formed by treating various of the " shellac substitutes " or phenol resins now known, in a manner to be later described. The ultimate condensation product referred to may be formed directly in the molds in the desired final shape, or it may be cast into solid slabs, bars, cylinders, or other desired form, and subsequently heated and pressed into the desired shape. The degree of plasticity will vary in accordance with various of the ingredients of the mass. This ultimate condensation product, according to different phases of my invention, may be either a hard, infusible phenolic condensation product or it may be a solid solution of such a condensation product and a solid solvent or plasticity ingredient, of a nature to be described. This latter product, which is the one referred to above as sufficiently plastic, on application of heat to be shaped or pressed to form at suitable temperatures, is not claimed herein, but, together with a process for making the same, forms the subject matter of my application Ser. No. 630,894, filed June 2, 1911, which is a division of this application. Also, a product and process, in which the solid solvent element referred to consists specifically of an organic acid or anhydrid thereof, are described and claimed in my application Ser. No. 630,893, filed June 2, 1911, which, as to such features, constitutes a division of this application. Herein I will claim ultimate condensation products, made according to my invention, and processes for making such products, which products and processes do not involve the use of the solid solvent elements described herein.

The objects of my invention are accordingly the production of the hard fusible phenol resin, and the infusible ultimate condensation products, referred to, together with the novel processes by which the same are produced or which contribute to the production of the same, all as hereinafter described and claimed.

In order that my invention may be more clearly understood, attention is hereby directed to the accompanying drawing, forming part of this specification, and illustrating diagrammatically one form of apparatus wherein may be carried out, in one of its forms, my improved method for forming the phenol resin referred to.

In practising my invention I first form the hard fusible phenol resin from phenol or cresol or equivalents, by condensation, preferably with formaldehyde, as above stated. This resin may be produced in several ways, as will be hereinafter described. In the formation therefrom of the ultimate condensation product, or in the formation from any suitable phenol resin of a final condensation product embodying the advantages of my invention, formaldehyde, preferably in polymerized form, is incorporated with the phenol resin, in the proportion of about 5 to 7½ per cent. of the weight of the resin, and dissolved therein. The solid polymerized forms of formaldehyde are preferred because they are the only anhydrous forms in which formaldehyde occurs. Phenol resin is non-water-soluble, and consequently will not mix with a water solution of formaldehyde, but is a solvent when in melted or dissolved condition for anhydrous formaldehyde. If formaldehyde solution is used instead of polymerized formaldehyde, heating to reaction temperature drives off the water and a considerable part of the formaldehyde from the solution, and converts the remainder of the formaldehyde into the polymerized form, which then dissolves in and reacts with the resin. With this method it is more difficult to obtain the correct reacting proportion of the formaldehyde component. Also, preferably, a small percentage of a water-combining element, such as an anhydrid of an organic acid, and a percentage of a solvent of the final product, which may also act as a thinning or anti-viscosity agent, are incorporated therewith, the species of my invention in which the final product solvent is used, however, not being claimed herein, as stated above. The nature and purpose of the water-combining element and the final product solvent element will be described hereinafter.

Having obtained the above mixture the same may be cast in suitable molds for the formation of the desired articles or for the formation of rods, sheets, tubes, or slabs, or the like, from which the desired articles may subsequently be made by heat and pressure, or by forming by tools. The molds and their contents are heated sufficiently to transform the product into a hard, infusible, chemically inert substance, the temperature to which the same is heated in practice varying between 260° and 400° Fahrenheit, depending on the treatment of the phenol resin before mixing, the character of the water-combining element and the character of the molded article. The heating may be accomplished by casting in suitable steam-jacketed molds, or by placing the molds and contents in suitable ovens for a time sufficient to allow the mixture to interact and harden. This time may vary within wide limits, depending on the thickness of the article and the character of the mass. Thin sheets and small articles may be hardened in a few minutes, while larger masses and objects of special character may require gradual heating to the lowest temperature necessary for the reaction to take place and continued heating at such temperature, or at an elevated temperature, for several hours. The ultimate product so formed will not melt at any temperature below that of its decomposition, but will soften and become sufficiently plastic at from 240° to 300° F., to be further shaped by pressing in suitable dies or molds, when made with a final product solvent element, as stated. The product also is insoluble in common solvents, regardless of the incorporation therein or omission therefrom of the final product solvent elements referred to. The degree of plasticity may be controlled to a certain extent by the nature of the solvent ingredient and proportions thereof, and by varying the proportions of the polymerized formaldehyde, added to the phenol resin. In case the plasticity is controlled by varying the proportion of the polymerized formaldehyde, the phenol resin itself acts as a solvent for the ultimate product to an extent sufficient to render it plastic when heated, in this case the proportion of formaldehyde being less than in products in which the plasticity is controlled by added solvent elements.

As stated, the phenol resin or fusible condensation product may be formed in several different ways. With the first of these methods, the phenol or cresol is heated in an autoclave to a temperature of from 260° to 340° F., and maintained at such temperature. I prefer to use a temperature between 280° and 300° F., but a higher temperature is necessary under some circumstances. The temperature to which the phenol is heated is determined by the nature of the phenol used, and the time in which it is desired to form the resin, which is correspondingly shorter as a higher temperature is used. The melting point of the product formed is found by experience to vary with the use of different temperatures. Formaldehyde gas, which may be formed in suitable generators, is forced by suitable pumps into the bottom of the autoclave where it is distributed by means of a finely perforated coil into a multitude of bubbles, which pass upward through the phenol and are absorbed therein and combined therewith. A pressure in slight excess of the vapor tension of the contents of the autoclave is maintained in the autoclave by means of feeding compressed formaldehyde gas therein as rapidly as it combines with the phenol. At a pressure of 50 to 100 pounds per square inch, good results may be obtained. The reaction may be carried on more rapidly at higher temperatures than those which I have above described as preferable and convenient. The pressure used is about the same as that of water vapor at the temperature used.

The contents of the vessel are preferably kept in rapid circulation by a propeller or other convenient means. The reaction proceeds rapidly and provision should be made for carrying off the excess heat above the proper reaction temperature, which is the temperature to which the phenol was initially heated. Such a heat in excess of that necessary to maintain the reaction temperature will be generated by the reaction itself. The supply of formaldehyde is continued until a sample withdrawn for test, shows only a very small percentage of free or unchanged phenol. The supply of gas is then stopped and a vent in the autoclave is opened for the escape of steam, which is regulated by a suitable valve. The contents of the chamber are then heated to complete dehydration, which requires about 400° F. of heat. The contents are then cooled to about 240° F. and cast in ingots for subsequent use, or passed into suitable mixing vessels for immediate use.

Referring to the drawing illustrating a means for practising the first method of forming phenol resin described, formaldehyde is generated in the generator 1, and passes through condenser 2, which removes unchanged methyl-alcohol therefrom, to the gasometer 3, which is provided with an oil seal and is adapted to be steam heated. Formaldehyde gas is taken therefrom as desired, by pump 4 and allowed to pass as bubbles from perforated pipe 5 into the liquid phenol 6 in the autoclave 7 which is provided with steam jacket 8, agitator 9, pressure gage 10, vent 11 for the escape of steam when necessary, which is regulated by a valve 11', and safety valve 12. Provision should be made for steam heating the pipes through which the formaldehyde passes, and for passing cooling water through steam jacket 8 when the reaction has started to prevent the temperature from rising above the proper reaction temperature. This can be regulated by thermometer 13.

In the second of the methods above referred to by which the phenol resin may be formed, phenol and a 40 per cent. solution of formaldehyde, together with a small percentage of either an acid or a basic acceleration or catalytic agent, are treated and allowed to interact to form rapidly the ultimate condensation product of the phenol and the formaldehyde in the form of an infusible porous mass. This mass will be porous because of the evolution of the dissociation gases, which as is well-known, takes place when the reaction between the phenol and formaldehyde is allowed to rapidly ensue at an elevated temperature and under no counteracting pressure. In this case, however, this is of no moment, because of the subsequent treatment of the mass. This infusible mass is preferably crushed and pulverized and then baked at approximately 350° F., whereby entrapped water and acid vapors are expelled. The powdered and dried substance is mixed with phenol or cresol in approximately the proportion of two parts of the final condensation product to one part of the phenol, and heated in a closed vessel under its own pressure to a temperature of from 450° to 550° F., for several hours. By this treatment the ingredients of the mass go into the solution with a chemical change, whereby the product reverts or is broken down to the fusible resin, presumably by reduction of the formaldehyde element in the combination. By this means after the distillation of the excess unchanged phenol, a resin is formed similar to that described in the process first described.

The ultimate condensation product after solution in the phenol, as stated in the last described process, may be entirely converted into the phenol resin by means of the first process, that is to say, after the solution of the porous ultimate condensation product in the phenol or other solvent used, compressed formaldehyde gas may be forced into the solution as fast as it combines with the excess phenol, and the process carried on from that point as described in the first process. In this process, however, there would be no distillation of excess phenol, as was the case in the second process, the excess phenol being combined with the added formaldehyde as just stated, to form more phenol resin. Acid or basic condensing agents as above noted, are apparently necessary in small percentages in this process of breaking down a phenol infusible condensation product to the fusible condensation product or phenol resin, as material so formed without such agents does not readily dissolve in the phenol except at much higher temperature.

It is especially advantageous to combine methods 1 and 2, as just described, because thereby a manufacturer is enabled to use scrap material and discarded and imperfect articles. Phenol and cresol are the preferred solvents for the ultimate condensation product, but other solvents may be used, such as a mixture of phenol and naphthalene, the naphthalene in this case being removed by distillation after the solution is formed.

The phenol resin obtained by any of the methods described after complete dehydration and removal of excess phenol is a hard resin, very similar in texture to copal and kauri gum. It is soluble in all proportions in alcohol, acetone and other of the common solvents from which it remains unchanged after evaporation of the solvents. It is fusible and practically unchanged when heated to 420° F. It melts at about 220° F., but has no sharp melting point passing through various degrees of viscosity, until at 250° F. it may readily be poured and at 350° F. it becomes quite thinly fluid. It acts as a weak acid toward bases with which it combines. It is soluble in shellac, resin and similar substances when fused therewith. This resin will not form the hard infusible condensation product described by Smith, Story, Baekeland, and others, (see English Patents 16,247, of 1899, to Smith, and 8,875 of 1905, to Story, U. S. Patents, 982,699 to Baekeland, and 735,278 to Luft, and an article by W. Kleeberg, in the German publication "*Annalen der Chemie*", Liebig, volume 263, page 283, 1891) heated with basic or acid condensing agents, or alone, at any temperature. When mixed with formaldehyde, para-formaldehyde or trioxymethylene, and heated, it combines therewith and forms a hard infusible mass, which, if not admixed with other bodies, remains transparent and chemically inert. It will not, however, form such hard infusible mass when mixed with aldehydes in general, other than those mentioned, and if the percentage of formaldehyde or its polymers exceed about 7½ per cent., the excess escapes as bubbles in the mass and renders the latter useless for some purposes.

In addition to methods 1 and 2 and the combination thereof previously described for forming phenol resin, I may use a 35% solution of formaldehyde in the proportion of 1000 parts of phenol to 750 parts of formaldehyde by weight, and heat the mass to a temperature of from 300 degrees to 320 degrees F. under its own pressure, without any agent. If a 40% solution of formaldehyde is used, the proportions should be about 650 parts of formaldehyde to 1000 parts of phenol. In the above proportions, formaldehyde solutions are given as volume percentages. The weight percentage of the formaldehyde in the solution is approximately 5% less. The proportions of formaldehyde solution given in the formulæ are slightly more than the required amount to allow for losses during the process. In this method as in method No. 1 above described, care must be taken to avoid the presence of any impurity which will act as an accelerator or catalytic agent, otherwise difficultly fusible and very viscid products will result. For instance, if the operation is carried out in an iron vessel, care must be taken to have the iron well enameled or lined with a metal which will not modify the product. Iron and lead so modify the product as to render the latter unfit. Tin, or tinned copper, or nickel, are metals which can be used to line the vessel without modifying the product. If crude phenol or cresol are used, they should first be refined by distillation to eliminate basic metallic impurities as well as mineral acids. In process No. 2, above described, for making phenol resin, when naphthalene and phenol are used as a solvent, for the ultimate condensation product to be transformed or broken down into the phenol resin the phenol must be added in the proportion of about 20 per cent., of the condensation product and the naphthalene in about the proportion of from 50 to 100 per cent. of the condensation product.

In the formation of the ultimate condensation product, the phenol resin is mixed as stated, with formaldehyde which is preferably polymerized. The substances of this character which I consider best adapted for the purpose are trioxymethylene and dioxymethylene, in an amount which is sufficient to combine with nearly all the resin, so that there may be no excess of formaldehyde or polymer thereof to cause bubbling of the mass during the hardening operation. Such an amount may vary between 5 and 7½ per cent. of the weight of phenol resin used. Formaldehyde, not polymerized, may be used in place of the polymerized substance, in which case the polymerized formaldehyde is formed by evaporation during the process. It is usually impracticable to make the phenol resin entirely free from uncombined phenol, and the small variable percentage of phenol makes it necessary in the formation of the mixture for the ultimate product to vary the percentage of paraformaldehyde, which may be either di-oxymethylene or tri-oxymethylene, or a mixture of the two, in the mixture with the resin, in accordance with the percentage of free phenol, ascertained by test. The phenol combines with a much greater proportion of polymerized formaldehyde than does the phenol resin. By varying the percentage of the polymerized formaldehyde as indicated, the free phenol in the phenol resin may all be taken into combination. The product thus obtained after heating the phenol resin and the other elements mentioned in proper proportions to a temperature of from 280° to 400° F. or higher, is somewhat similar to the final condensation product described by Baekeland and others, but differs in four important particulars, as follows: First, the ingredients of the ultimate product may be baked during the hardening operation by heating as hereinafter explained to a temperature of from 260° to 350° F. without becoming porous from gas bubbles other than such as may be entrapped by the mass when cast, thus rendering it unnecessary to heat or perform the hardening operation under a counteracting pressure in closed vessels. Secondly, the ultimate condensation product so formed, softens sufficiently to allow further shaping, as stated, at a temperature between 240° and 300° F. while at the same time it is infusible at any temperature lower than that of its decomposition. Thirdly, my product is tougher and less brittle in texture than the substances previously known in the art, as referred to above, because no basic accelerating or catalytic agent is necessary or even desirable. This distinction, however, applies only to the product made with phenol resin formed in accordance with method No. 1 described above, since in method No. 2, a condensing agent is necessary. This absence of a condensing agent or other impurity permits the formation of an ultimate product which is almost colorless, when desired. Fourth, the ultimate product here described and claimed may be made of exact and definite ultimate composition under perfect control, whereas, by the known methods in vogue, an intermediate and final product are made which are not under such control, resulting in excessive losses. Economy in manufacture of the product is also enhanced. The ultimate product is further distinguished from the similar substances heretofore known by the incorporation therewith of a water-combining element, and a final product solvent element in varying percentages.

The water-combining element takes care of traces of water which may be expelled during the baking operation. This results in a clearer and more transparent product, although I do not regard the inclusion of this element as absolutely essential. Examples of this class are benzoic anhydrid, phthalic anhydrid, and any such organic anhydrids as are soluble in and miscible with the mass, and are not decomposed at temperatures used. The final product solvent element contributes greater toughness to the product by counteracting the brittle nature of the final product and renders the ultimate mass plastic when heated, thus relieving internal stresses during the baking and hardening operations and subsequent cooling.

By final product solvents, I include only substances which will dissolve the ultimate condensation product or combine therewith at the baking temperature, render it plastic at such temperature, and remain as a part of the product in the condition of solid solution. Examples of substances of this class are naphthalene and some of its derivatives, such as nitro and chloro derivatives, especially the mono-nitro and di-nitro naphthalenes, di-nitro benzene, preferably the meta variety, acetanilid, ricinoleic acid, and ricinelaidic acid, and their anhydrids; benzoic acid and anhydrid, and di-phenylamin-naphthalene which is noted among the final product solvents is a substance which tends to volatilize slowly at ordinary temperatures when alone. It does not, however, volatilize perceptibly at ordinary temperatures when in solid solution with the ultimate condensation product, and within the proportions given in some of the following examples. The naphthalene derivatives mentioned when in solid solution with the ultimate condensation product do not volatilize either at ordinary or at elevated temperatures. In many cases anhydrids of organic acids may be added which will perform both the water absorbing function and the solvent or plasticity function. Such substances include benzoic anhydrid and ricinelaidic anhydrid. For special uses, I may also advantageously add small percentages of acid catalytic or condensing agents when mixing the phenol resin and the other ingredients for the purpose of causing the final reaction to ensue more rapidly and at a lower temperature. Effective agents for this purpose are small amounts ($\frac{1}{10}$ to 2 per cent.) of the hydrochlorids of a variety of organic radicals, such as anilin hydrochlorid, hydroxylamin hydrochlorid, and pinene-hydrochlorid. By the use of such agents the hardening reaction can be made to take place at temperatures much below 250° F.; without such agents the reaction proceeds much more slowly and at higher temperatures. Such a composition is particularly well suited for hard varnish and lacquers by mixing and dissolving in alcohol, or equivalent volatile solvents, and when dried heating moderately in a steam oven. Suitable chemically inert pigments and fillers may be incorporated with the mass when desired.

The mass of the ultimate condensation product is normally of amber color and transparent. It may be made practically colorless if special precautions are taken to exclude color-giving impurities from the phenol and to exclude oxygen during subsequent heat treatment. It may also, if desired, be given any desired color by the addition of suitable pigments. Chemically inert cheaper substances in powdered or fibrous form may be incorporated with the mass before baking in widely varying per cents., when desired.

Preferred formulæ for masses which are to be hardened in molds without subsequent pressing operations are as follows:—

*For light colored and transparent products.*

|  | Parts by weight. |
|---|---|
| (1) Phenol resin | 100 |
| Polymerized formaldehyde | 5 to 7 |
| Benzoic anhydrid | 5 to 10 |
| (2) Phenol resin | 100 |
| Naphthalene | 5 to 10 |
| Polymerized formaldehyde | 5 to 7 |
| (3) Phenol resin | 100 |
| Benzoic anhydrid | 2 to 4 |
| Naphthalene | 5 to 10 |
| Tri-oxymethylene | 5 to 8 |

*For wine-colored products.*

|  | Parts by weight. |
|---|---|
| (4) Phenol resin | 100 |
| Meta di-nitro benzene | 5 to 10 |
| Para-formaldehyde | 5 to 7 |

*For non-melting plastic compositions.*

| | Parts by weight. |
|---|---|
| (5) Phenol resin | 100 |
| Naphthalene | 10 to 40 |
| Para-formaldehyde | 5 to 20 |
| (6) Phenol resin | 100 |
| Naphthalene | 10 to 20 |
| Benzoic anhydrid | 1 to 5 |
| Para-formaldehyde | 5 to 10 |
| (7) Phenol resin | 100 |
| Meta di-nitro benzene | 10 to 50 |
| Para-formaldehyde | 5 to 7 |
| (8) Phenol resin | 100 |
| Di-nitro benzene | 10 to 40 |
| Benzoic anhydrid | 1 to 5 |
| Para-formaldehyde | 5 to 8 |
| (9) Phenol resin | 100 |
| Acetanilid | 7 to 30 |
| Para-formaldehyde | 6 to 8 |
| (10) Phenol resin | 100 |
| Tetra chloro naphthalene | 10 to 25 |
| Benzoic anhydrid | 1 to 5 |
| Para-formaldehyde | 5 to 8 |
| (11) Phenol resin | 100 |
| Mono-nitro naphthalene | 7 to 30 |
| Para-formaldehyde | 6 to 8 |
| Benzoic anhydrid | 1 to 5 |

The specific gravities and other qualities of various of these compositions which are given merely as examples, were found to be as follows:

| | Parts by weight. | |
|---|---|---|
| Phenol resin | 100 | Specific gravity 1.257 at 72° F. |
| Benzoic anhydrid | 15 | Color, light amber, transparent. |
| Para-formaldehyde | 9 | |
| Phenol resin | 100 | Specific gravity 1.248. |
| Para-formaldehyde | 6 | Color, light amber, transparent. |
| Phenol resin | 100 | Specific gravity 1.246. |
| Phenylacetamid (acetanilid) | 13 | Color, light amber, orange tint, transparent. |
| Para-formaldehyde | 8 | |
| Phenol resin | 100 | Specific gravity 1.324. |
| Tetra-chloro naphthalene | 20 | Opalescent amber color. |
| Para-formaldehyde | 8 | |
| Phenol resin | 100 | Specific gravity 1.317. |
| Di-nitro benzene (meta) | 40 | Deep red wine color, transparent and clear. |
| Benzoic anhydrid | 2 | |
| Para-formaldehyde | 6 | |

The specific gravity of the phenol resin used was found to be 1.240. This substance is transparent and varies in tint from colorless to a dark coffee shade.

In all of the formulæ given above for the ultimate condensation product, the ingredients are mixed and freed from air bubbles by standing in molten condition or by vacuum treatment or by centrifugal treatment at temperatures below 250° F. or freed from air bubbles in any other suitable manner. The mass is then poured into molds and is preferably slowly heated to a temperature of from 260° to 270° F., at which temperature it is maintained for a sufficient time to render the mass infusible, and subsequently is heated for a short time to a temperature of 300° to 350° F. The ingredients may also be heated to from 320° to 350° F. under counteracting pressure, as is done in the art of vulcanizing rubber. When no counteracting pressure is used, from one-half to four hours is required before the final temperature may be reached, this time varying with the thickness of the object molded. The plastic compositions indicated in the formulæ 5 to 11 become sufficiently plastic to mold at from 240° to 300° F.

It will be seen that a condensation product, which is fusible and soluble in common solvents, is formed by the reaction of a phenol and formaldehyde in such proportions that the phenol is almost entirely combined with the formaldehyde, and there is no excess or free formaldehyde. When formaldehyde is added to the resinized phenol or phenol resin so produced and the mass is heated to a temperature suitable for the reaction, an infusible hard ultimate condensation product is formed which is chemically inert, insoluble in common solvents, and having the other properties previously noted. My invention accomplishes the production of a synthetic resin, such as the phenol resin above referred to, and an ultimate condensation product, such as that described, having no excess of formaldehyde. As far as I am aware, no one prior to my invention has taken advantage of these facts, to control the production of the desired substances, or has clearly recognized the existence of such facts. Furthermore, no one within my knowledge has recognized the possibility of forming an ultimate condensation product, such as described, dissolving the same in a proper amount of phenol or other solvent and breaking down the ultimate product to a fusible condensation product, which is lowered in the proportion of its formaldehyde element, or practised the said process for the production of a fusible resinized phenol. The action of an ultimate phenol condensation product in the presence of phenol in the manner referred to would seem to confirm the belief that the hardening of the ultimate condensation product and the achievement of the other properties noted, are due to the combination of a further amount of formaldehyde with the phenol resin after the phenol element thereof has been completely satisfied by combination with formaldehyde in the formation of the lower condensation product or phenol resin. In the case of the breaking down process by which the ultimate product is reduced to the fusible condensation product, the formaldehyde combined with the phenol resin is apparently taken out of combination with the phenol resin by the excess phenol with which it combines to form more phenol resin, the excess of phenol above that necessary for such combination being distilled away, or converted into phenol resin by adding more formaldehyde.

The "shellac substitutes" previously referred to are substances well known as a class, being synthetic resins, more or less fusible and soluble, which are intended to be used as substitutes for natural resins, colophony, etc. They are usually formed by the condensation of a phenol and formaldehyde, which are incorporated together in different proportions in different products. The "phenol resin" made and described by me belongs to this class, but has the special characteristics described which render it especially useful in the preparation of my ultimate, infusible product. The phenol resin described is, as I have stated, completely anhydrous when heated to about 400° F. for complete dehydration. When so heated all the water, both free and combined, is driven off from the product.

The terms "anhydrous" and "dehydrated" appearing in the following claims as a qualification of the phenol resin, describe the latter as containing no water either in free or combined state. The ultimate infusible product formed by the reaction between such an anhydrous phenol resin and an added amount of anhydrous formaldehyde or its polymers, as described, is also anhydrous, as stated, if the small amount of water evolved by the reaction between the resin and the added formaldehyde is permanently fixed by combination with a water-combining element, such as I have described. That is, if a water-combining ingredient is present in the mass, as stated, the water evolved is combined with the water-combining element, and is permanently fixed to form a harmless ingredient in the mass. Thus, for example, if phthalic or benzoic anhydrid is used as the water-combining element, as stated, the water evolved combines with the same to form the corresponding acid, as stated.

The term "fusible" appearing in the claims, as qualifying a product such as my phenol resin, denotes a product which melts and becomes liquid, when sufficiently heated, under atmospheric pressure.

The term "infusible" in the claims, as qualifying my ultimate product, denotes a substance which does not flow or become liquid, when heated to any temperature, under atmospheric pressure. When an ultimate product solvent element is added, or an excess of phenol resin is used as a solvent for the ultimate product, as stated, the mass becomes sufficiently plastic to be readily pressed or molded to shape, but does not fuse.

The word "phenol" as employed in the claims is intended to include the equivalents of phenol for the purposes of this invention, and the word "formaldehyde" is intended generically to include the polymers and other recognized equivalents of formaldehyde.

It will be noted that my invention, comprising the incorporation of formaldehyde, preferably in polymerized, solid anhydrous form, as di-oxy-methylene or tri-oxy-methylene, with phenol resin, may be stated to consist in incorporating with phenol resin a formaldehyde compound having the formula $(CH_2O)n$, where $n$ is a number less than 4, in the manner described. It should also be noted that my product as preferably made is free from accelerating or catalytic agents or impurities acting as such. Therefore it may be said to be free from basic substances and mineral acids.

Having now described my invention, what I claim as new and desire to secure by Letters Patent, is as follows:—

1. The process of forming a hard infusible product consisting in incorporating with a fusible phenol resin a formaldehyde compound having the formula $(CH_2O)n$ where $n$ is a number less than 4, of a quantity just sufficient to combine with substantially all of the same, and heating the mass sufficiently to cause the reaction to ensue and the mass to be transformed into a hard infusible chemically inert product, substantially as described.

2. The process of forming a hard infusible product consisting in forming an anhydrous fusible phenol-formaldehyde condensation product containing no uncombined formaldehyde, incorporating therewith a formaldehyde compound having the formula $(CH_2O)n$ where $n$ is a number less than 4, of a quantity just sufficient to combine with substantially all of the same, and heating the mass sufficiently to cause the reaction to ensue and the mass to be transformed into a hard infusible chemically inert product, substantially as described.

3. The process of forming a hard infusible product consisting in determining the percentage of uncombined phenol in a fusible phenol resin incorporating therewith a quantity of formaldehyde compound having the formula $(CH_2O)n$ where $n$ is a number less than 4, calculated to be in proper proportion to cause the combination of the formaldehyde compound upon application of sufficient heat, with substantially all of the resin and uncombined phenol contained therein to form the desired substance, and heating the mass to a temperature, and for a length of time sufficient to cause a complete hardening reaction between the said ingredients, said temperature not to exceed 350° F., substantially as described.

4. The process of forming a hard infusible, insoluble product, consisting in incorporating with a fusible anhydrous phenol resin, an anhydrous formaldehyde compound having the formula $(CH_2O)n$ where $n$ is a number less than 4, in an amount the variation of which is determined by the ascertained percentage of uncombined phenol in the resin to be a sufficient amount to form a hard infusible, insoluble product, and applying heat sufficient to cause a condensation reaction between the resin and the said formaldehyde compound, forming the desired hard infusible product, substantially as described.

5. The process of forming a hard infusible product consisting in incorporating with a fusible anhydrous phenol resin, a formaldehyde compound having the formula $(CH_2O)n$ where $n$ is a number less than 4, in an amount determined by the percentage of uncombined phenol in the resin to be the proper amount to entirely enter into combination with substantially all of the resin, and uncombined phenol contained therein, on application of sufficient heat, and applying heat sufficient to cause a condensation reaction between the ingredients forming the desired hard infusible product substantially as described.

6. The process of forming a hard infusible product consisting in incorporating with a fusible phenol resin a solid anhydrous polymerized formaldehyde just sufficient in amount to react with substantially all of the same, and heating the mass sufficiently to cause the reaction to ensue and the mass to be transformed into a hard infusible chemically inert product, substantially as described.

7. The process of forming a hard infusible product consisting in forming a hard fusible phenol resin, completely dehydrating the same, incorporating therewith from 5 to 7½% of an anhydrous formaldehyde compound having the formula $(CH_2O)n$ where $n$ is a number less than 4, and heating the mass at a temperature of 260° F. or over, for a sufficient time to transform the mass into an infusible chemically inert product substantially as described.

8. The process of forming a hard infusible product consisting in forming a completely dehydrated fusible condensation product of phenol and formaldehyde, in which the formaldehyde is not quite sufficient in quantity to combine with all the phenol to form a fusible product, incorporating therewith an amount of formaldehyde compound having the formula $(CH_2O)n$ where $n$ is a number less than 4, just sufficient to combine with the free phenol and with the fusible condensation product, without any excess of formaldehyde compound, and heating the mass at a temperature, and for a time sufficient to transform the product into a hard infusible chemically inert substance, substantially as described.

9. As a new composition of matter, a hard infusible condensation product of a fusible anhydrous phenol resin and an anhydrous formaldehyde compound having the formula $(CH_2O)n$ where $n$ is a number less than 4, the said product being free from basic substances and mineral acids, substantially as described.

This specification signed and witnessed this 13th day of May 1909.

JONAS W. AYLSWORTH.

Witnesses:
    DYER SMITH,
    ANNA R. KLEHM.